(12) United States Patent
Kiefl

(10) Patent No.: US 8,047,830 B2
(45) Date of Patent: Nov. 1, 2011

(54) BLOW MOLDING MACHINE AND HOLDER FOR FITTINGS

(75) Inventor: Michael Kiefl, Wallersdorf (DE)

(73) Assignee: Krones AG, Neutraubling (DE)

( * ) Notice: Subject to any disclaimer, the term of this patent is extended or adjusted under 35 U.S.C. 154(b) by 580 days.

(21) Appl. No.: 12/198,598

(22) Filed: Aug. 26, 2008

(65) Prior Publication Data

US 2009/0061041 A1  Mar. 5, 2009

(30) Foreign Application Priority Data

Aug. 27, 2007 (DE) .................. 10 2007 040 620

(51) Int. Cl.
*B29C 49/42* (2006.01)
*B29C 49/68* (2006.01)

(52) U.S. Cl. ... 425/182; 425/526; 425/534; 198/867.11; 198/867.14; 198/867.15

(58) Field of Classification Search .................. 425/182, 425/526, 534; 198/867.01, 867.11, 867.14, 198/867.15

See application file for complete search history.

(56) References Cited

U.S. PATENT DOCUMENTS

| | | | | |
|---|---|---|---|---|
| 3,740,868 A | * | 6/1973 | Moore et al. ................ | 425/526 |
| 4,070,428 A | * | 1/1978 | Krall et al. .................. | 425/534 |
| 4,351,631 A | | 9/1982 | Gessner et al. | |
| 4,456,447 A | * | 6/1984 | Smith .......................... | 425/182 |
| 4,763,778 A | * | 8/1988 | Feddersen et al. ........ | 198/867.14 |
| 5,066,222 A | | 11/1991 | Roos et al. | |
| 2010/0310705 A1 | * | 12/2010 | Schonberger et al. ...... | 425/526 |

FOREIGN PATENT DOCUMENTS

| | | |
|---|---|---|
| DE | 3306510 | 8/1984 |
| DE | 3420857 | 12/1985 |
| DE | 3425602 | 1/1986 |
| EP | 0387737 | 9/1990 |
| FR | 2720681 A1 * | 12/1995 |
| WO | WO-95/33616 | 12/1995 |

OTHER PUBLICATIONS

Partial translation of FR 2720681 A1 dated Dec. 1995 obtained from the esp@ce.net website.*
European Search Report for 08014156 dated Dec. 17, 2008.

* cited by examiner

*Primary Examiner* — Robert B Davis
(74) *Attorney, Agent, or Firm* — Marshall, Gerstein & Borun LLP

(57) ABSTRACT

For use in a blow molding machine for containers, especially plastic bottles, a production line is provided for thermally pretreating preforms transported by holders, where each holder is loaded with at least one exchangeably fixed fitting such as a shielding plate. To reduce the exchange period for the holders the fitting is secured by a quick-change element which remains on the holder during the exchange and is adjustable on the holder between a secured position and a release position by the application of an external force, and which can be adjusted manually and/or mechanically.

18 Claims, 4 Drawing Sheets

US 8,047,830 B2

BLOW MOLDING MACHINE AND HOLDER FOR FITTINGS

CROSS-REFERENCE TO RELATED APPLICATION

The present application claims the benefit of priority of German Patent Application No. 102007040620.9, filed Aug. 27, 2007. The entire text of the priority application is incorporated herein by reference in its entirety.

FIELD OF THE DISCLOSURE

The disclosure relates to a blow molding machine, particularly to changing out holder fittings for blow molding machines.

BACKGROUND

Further technical developments have permitted a considerable increase in the production rates of modern blow molding machines. As in practice the tendency goes toward producing a very large number of different containers in one and the same blow molding machine, which differ, for example, by differently formed orifices and which require the retooling of the blow molding machine, the possible high production rates are opposed by inexpediently long exchange periods and complicated exchange procedures. Developments are being made to shorten the exchange periods for fittings such as preform mandrels significantly and to simplify and/or automate the exchange periods therefor. However, in blow molding machines used in practice, other fittings, e.g. shielding plates, which have to be exchanged during a retooling as well, are still exchanged by hand and in complicated exchange procedures. In the blow molding machine used in practice, each shielding plate is secured by a U-shaped spring bracket, which must be manually withdrawn from the holder and, after the new shielding plate was inserted, must be reinserted manually. The removal of the spring bracket requires a high expenditure of energy and great skills, while the reinsertion of the spring bracket requires a high targeted precision and a relatively strong thrust force. Therefore, the exchange period for each shielding plate is long. The exchange procedure is cumbersome, considering that often more than 100 shielding plates have to be exchanged over the production line.

SUMMARY OF THE DISCLOSURE

The disclosure is based on the object to provide a blow molding machine of the aforementioned type as well as a holder for the fittings, both permitting short exchange periods and a comfortable exchange procedure and even a semiautomatic or fully automatic exchange of the fittings.

As the quick-change element remains in the holder of the blow molding machine as the fittings are exchanged, the cumbersome and exhausting insertion procedure after the exchange is omitted. Moreover, the quick-change element now merely has to experience an adjustment on the holder by the application of an external force so as to allow the exchange of the fitting, which can be carried out fast and with a relatively small expenditure of energy. The motion of adjustment is very uncomplicated and definite, so that no special care has to be exercised. Despite the usually limited space surrounding the holder the exchange period becomes extraordinarily short, and the exchange procedure is much more comfortable as in the past. The holder for the fittings including the quick-change element has been designed to allow a fast and comfortable exchange from the very beginning, namely by both an operator and semi- or fully automatically by an automatic changer, whereby the simple motion of the quick-change element and the small expenditure of energy constitute important advantages for this purpose.

In a useful embodiment the quick-change element defines an externally accessible press-button, which is pressed only substantially linearly in a direction transverse to the plug receptacle for the plug-in foot of the shielding plate. In doing so, the quick-change element is guided in the direction of adjustment against the force of a spring element, which may serve, for example, to produce and maintain the secured position. In an alternative embodiment the quick-change element could define a draw-button, which is drawn out of the secured position and into the release position substantially linearly against the force of the spring element. In each case, the quick-change element remains on the holder during the exchange, the spring element maintains the secured position, and the quick-change element only has to be moved by means of a short stroke and with a relatively small expenditure of energy.

In one preferred embodiment the fitting comprises two parallel plug-in feet, for which two plug receptacles are provided on the holder. The quick-change element is assigned to only one plug receptacle. It would be possible, however, to secure both plug-in feet by one quick-change element, respectively, and to adjust both elements together.

In one preferred embodiment an external force has to be applied to the quick-change element only for removing the fitting, while for the insertion of the fitting an internal force is applied by the plug-in foot itself, which temporarily displaces the quick-change element against the force of the spring element out of the secured position in the direction of the release position to such a degree that the plug-in foot can be inserted and the quick-change element automatically returns into the secured position by the force of the spring element.

In another embodiment, however, the quick-change element requires, for example, the same external force application for both removing and inserting the fitting.

In one expedient embodiment a circumferential cavity, preferably a circumferential groove is provided in the respective plug-in foot for the secured engagement of the quick-change element. To this end, the quick-change element comprises an engagement portion insertable into the circumferential cavity. The spring element has the task to maintain the secured position of the quick-change element. In the secured position, the plug-in foot and thus the fitting is then even locked and secured in a form-closed manner. This secured position is not released unintentionally even in the event of operational vibrations and/or thermal influences because the quick-change element engages into the plug-in foot in a lock-type manner.

In a structurally simple embodiment, a channel for the quick-change element is provided in the holder, which crosses the plug receptacle. The quick-change element projects out of the channel with a press-button head, which is arranged on a shaft and externally accessible. Expediently, the spring element is designed as a helical spring supported between the shaft and the channel, which prestresses the quick-change element towards the secured position. Interacting limit stops on the shaft and the holder prevent the quick-change element from escaping from the holder under the spring force.

Expediently, the channel entirely passes through the holder and the shaft projects over a channel opening at the end opposite the press-button head. On this projecting end the shaft carries the limit stop, which is preferably detachable for assembling purposes and which interacts with the channel opening so as to prevent the quick-change element from falling out.

A space-saving construction is achieved if the shaft and/or the press-button head is/are passed through by a passage in the transverse direction, preferably by a passage having the shape of an oblong hole, which may be, for example in the direction of adjustment of the quick-change element, oversized with respect to the outer diameter of the plug-in foot. On the one hand, this passages allows the plug-in foot to travel therethrough when the fitting is inserted or removed, respectively, provided that the quick-change element has been displaced sufficiently far from the secured position towards or into the release position, and it guarantees on the other hand the form-closed engagement into the circumferential cavity of the plug-in foot as soon as the spring element has shifted the quick-change element into the secured position. Both opening portions of the passage then interact with the circumferential cavity in a form-closed manner, or at least the opening portion of the passage which interacts with the rear edge of the circumferential cavity in the draw-out direction of the plug-in foot.

Expediently, the release position of the quick-change element is defined by an interaction between the press-button head and the channel opening facing the press-button head. This means that at least for removing the fitting the press-button head is pressed by the application of an external force until it abuts against the channel opening, because this guarantees that the plug-in foot can be inserted without any problems, without requiring a positioning of the quick-change element by the application of the external force.

By means of the quick-change element, which can be handled comfortably and with a small expenditure of energy and which remains on the holder during the exchange, the exchange period per fitting can be reduced considerably even if the exchange is carried out manually. Moreover, this concept is also very well suited for automatic exchange procedures because only a single, substantially linear force has to be exerted to a certain degree on a certain location to adjust the release position and remove or insert the fitting. This can be accomplished by means of at least one automatic quick-change machine, which is mounted at one point of the production line and which correspondingly adjusts the quick-exchange element on a holder or a group of holders and/or inserts the fitting(s) and/or removes the fitting(s). All these actions can be performed automatically or semiautomatically with manual assistance. Thus, the exchange period can be reduced even more and the comfort for the user can be increased significantly.

The automatic quick-change machine should comprise at least one quick-exchange element actuator and at least one fitting gripper, and preferably also at least one fitting magazine. The automatic quick-change machine can be moved and, if necessary, even be docked to the production line at a suitable place. It can exchange the fittings individually or in groups. It is even possible, if necessary at a reduced conveying speed, to make the automatic quick-change machine travel along with the production line or have it rotated, or arrange it stationarily as the production line is moved in cycles.

In another preferred embodiment the automatic quick-change machine is arranged stationarily relative to the production line and is operated in cycles in coordination with advance motion cycles of the production line, or the automatic quick-change machine is integrated in a driven star-shaped rotor which is arranged at the production line or is transferable to the production line and which rotates along with the advance motion cycles or even at a continuous conveying motion of the production line, thereby exchanging the fittings individually. If necessary, the automatic quick-change machine is combined with an automatic quick-change machine for other fittings in order to change at each exchange cycle some or all fittings to be exchanged for a changeover to another type of orifice of the preforms. Thus, for example, the shielding plates and the preform mandrels could be exchanged simultaneously.

BRIEF DESCRIPTION OF THE DRAWINGS

An embodiment of the subject matter of the disclosure is explained by means of the drawings. In the drawings.

DETAILED DESCRIPTION

Figure 1:
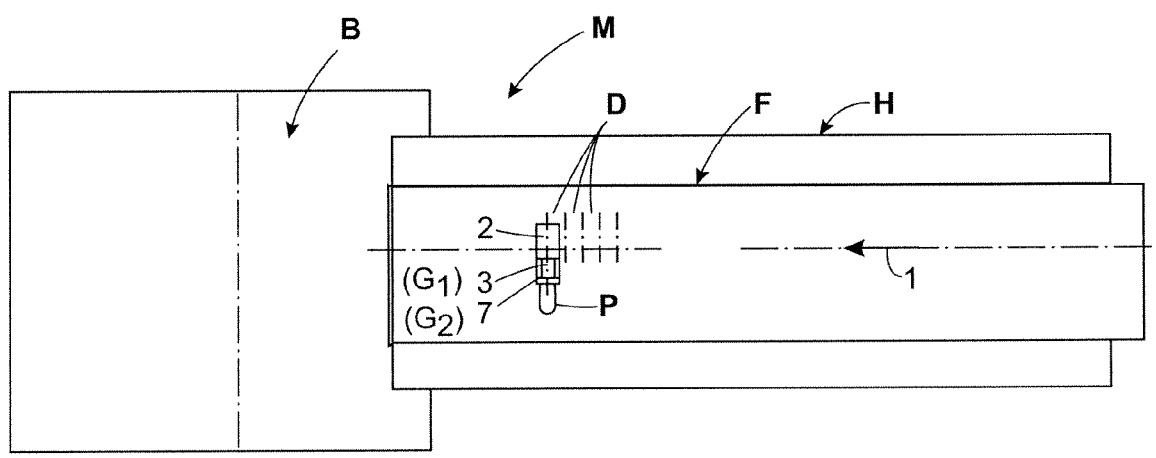
FIG. 1 is a schematic representation of a blow molding machine comprising holders provided with fittings in a production line.

FIG. 1 schematically illustrates a blow molding machine M for containers, e.g. a stretch blow molding machine for plastic bottles. A blow molding station B comprising a non-illustrated star-shaped rotor equipped with blow molds is connected to a production line F, which extends at least sectionwise through a heater H for preforms P to be treated by exposing them to radiation or in any other way by externally heating them or treating them thermally. The conveying direction of the production line F is shown by an arrow 1. The production line F comprises a plurality of mandrel devices D located closely adjacent to each other, each with a suspended holder 2 mounted thereon and at least one fitting G1 in the form of a preform mandrel 3, which is exchangeably mounted on the holder 2 and which is inserted into an orifice 4 (FIG. 2) of a respective preform P. In operation, the preform mandrels 3 are, if necessary, rotated about their axes, while they are thermally pretreated.

The orifice 4 of the preform P comprises, for example, an external supporting ring 5 (FIG. 2) and an external thread 6. Specifically this portion (supporting ring 5 and at least a portion of the external thread 6) must be shielded during the thermal pretreatment of the preform because it already has the later shape as in the finished blown container and could become damaged by the thermal pretreatment required by the other part of the preform P. To this end, a so-called shielding plate 7 having one or two plug-in feet 9 is mounted on the holder 2 as an additional exchangeable fitting G2, which shields this sensitive region of the orifice 4 of the preform P with an inner bore 8.

The plug-in foot 9 is inserted with a peg-shaped or tubular end portion 11 into a plug receptacle 10 of the holder 2, which is formed as a blind hole, where it is secured by a quick-change element S. Thus, the fitting G2 cannot be detached from the holder 2. To be able to remove the fitting G2 from the holder 2, the application of an external force to the quick-change element S is necessary, for example in the direction of an arrow 12. Then (FIG. 3) the fitting G2, i.e. the shielding plate 7, can be separated by means of the plug-in feet from the holder 2 (in the direction of an arrow 13) and can be replaced by another fitting G2 which, upon another application of force to the quick-change element S in the direction of arrow 12, is inserted into the plug receptacle 10 and automatically secured by the quick-change element S. The newly inserted fitting G2 differs, for example, by another size and design from the shielding plate 7 and the inner bore 8 thereof, whereas its end portion 11 mates the plug receptacle 10.

Figure 4:
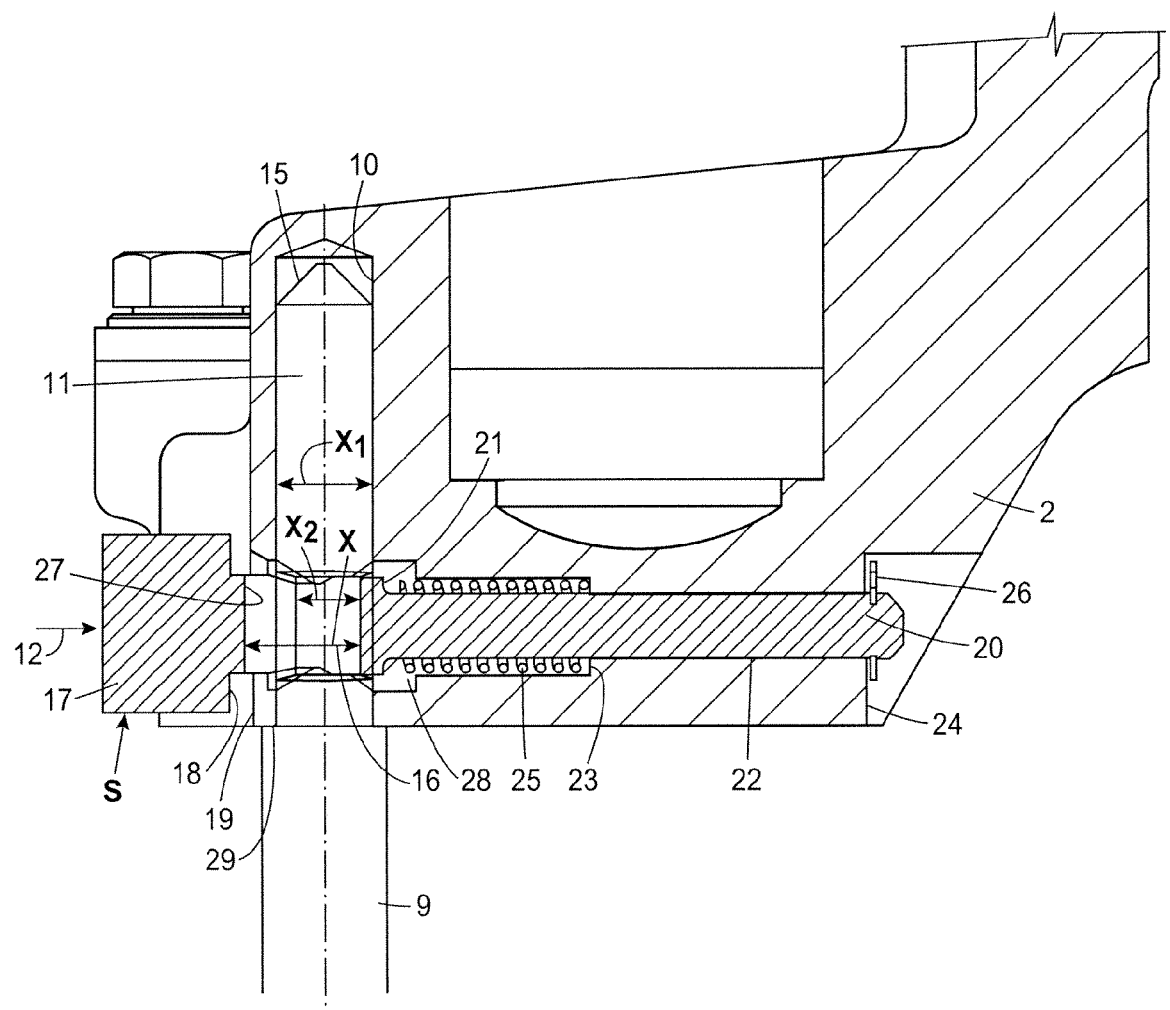
FIG. 4 is an enlarged sectional representation of FIG. 2.

The end portion 11 of the plug-in foot 9 additionally includes a circumferential cavity 16 for the form-closed engagement of the quick-change element S, expediently a circumferential groove 16, which shall be explained in more detail by means of FIG. 4.

An exchange can be accomplished manually, by exerting the force on the quick-change element S in the direction of arrow 12 with a finger or a tool and by manually removing or inserting the fitting G2, or mechanically by an automatic or semiautomatic quick-change machine, which performs all or at least some of the aforementioned steps.

Figure 2:
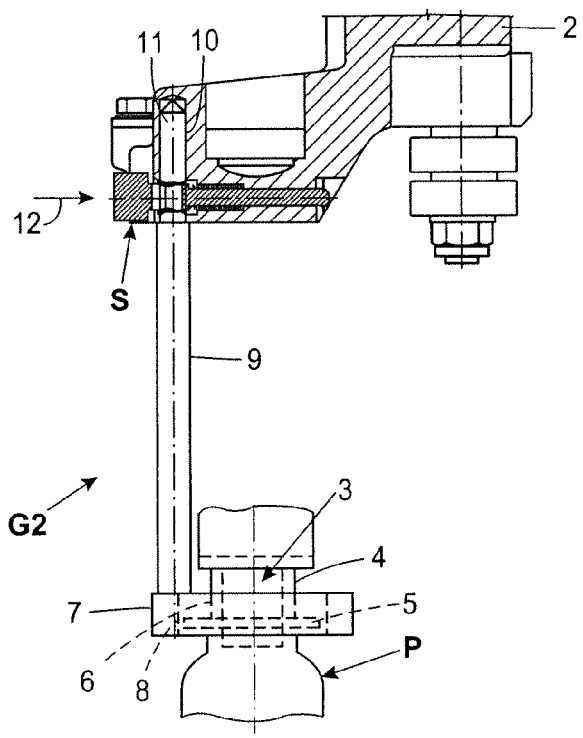
FIG. 2 is a partial section of a holder with an inserted fitting.
Figure 3:
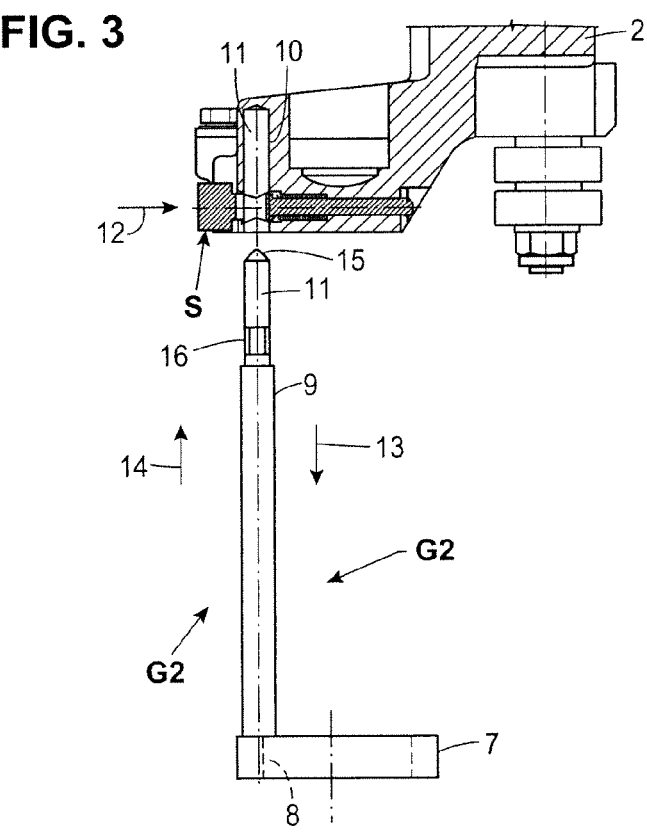
FIG. 3 is a partial section of a holder with a fitting just removed or just about to be inserted.

In the embodiment shown in FIG. 2 to 4, the quick-change element S must be displaced by the application of an external force to allow the insertion and the removal of the fitting. Alternatively, it would be possible to shape the tip of the end portion 11 designated with 15 in FIG. 4 conically or radiused in such a way that alone by introducing the end portion 11 the quick-change element S is temporarily pushed aside until the end portion 11 is seated in the plug receptacle 10 and is secured.

In the embodiment shown in FIG. 4, the quick-change element S comprises a press-button head 17, which is positioned on the holder 2 to be accessible from outside. A stop face 18 on the lower side of the press-button head 17 is oriented towards a stop face 19 on the holder and towards the opening of a channel 22, respectively, which channel 22 passes through the holder 2 in a direction transverse with respect to the plug receptacle 10. A pin-like shaft 20 is adjacent to the press-button head 17, the free end of which projects out of the channel 22 and carries a limit stop 26 interacting with a stop face 24 of the holder so as to prevent the quick-change element S from falling out. A collar 21 is formed on the shaft 20, while a collar 23 is formed in the channel 22. A spring element 25, e.g. a helical spring, is seated between the collars 21 and 23, which prestresses the quick-change element S in the direction towards the secured position shown in FIG. 4 and, without the end portion 11 in the plug receptacle 10, makes the limit stop 26 rest against the stop surface 24. The limit stop 26 is detachable, for example, for disassembling the quick-change element S.

The shaft 20 passes through a passage 27 which, in a direction perpendicular to the plane of projection in FIG. 4, at least has a width in correspondence with the outer diameter of the end portion 11 and which, in the direction of adjustment of the quick-change element S in channel 22, has a dimension x which may be greater than the outer diameter of the end portion 11. Expediently, the passage 27 is an oblong hole, as is shown in FIG. 4 by the bent lines of intersection on the periphery of the shaft 20. In the holder 2, a clearance 28 is recessed in the crossing area between the channel 22 and the plug receptacle 10, into which the collar 21 of the shaft 20 can be moved when the quick-change element S is displaced against the force of the spring element 25 to abut between faces 18, 19.

Expediently, the circumferential cavity 16 in the end portion 11 is a circumferential groove having a core diameter x2 smaller than the outer diameter x1 of the end portion 11. The end portion 11 forms a collar 29 at plug-in foot 9, which delimits the insertion depth into the plug receptacle 10. The end portion 11 and/or the quick-change element S may be cylindrical or may have any other optional cross-sectional shape.

In the secured position shown in FIG. 4, parts of the edges of the opening of passage 27 grip behind the boundaries of the circumferential cavity 16. This position is secured by the spring element 25. The plug-in foot 9 cannot be unplugged. If an external force is then applied to the quick-change element S, for example in the direction of arrow 12 shown in FIGS. 3 and 4, which overcomes the force of the spring element 25, the quick-change element S is displaced into its release position in which, for example, faces 18, 19 contact each other. Thus, the engagement between the edges of the opening of passage 27 and the boundaries of the circumferential cavity 16 is released. The plug-in foot 9 can be drawn out of the plug receptacle 10 by means of the end portion 11. Upon inserting the new fitting, again, the securing element S is moved into the release position against the force of the spring element 25 (if appropriate, by the wedge effect of the tip 15) until the end portion 11 is properly placed in the plug receptacle 10. Upon releasing the press-button head 17 (without any manipulation of the quick-change element S) the spring element 25 then presses the quick-change element S into the secured position shown in FIG. 4.

Figure 5:
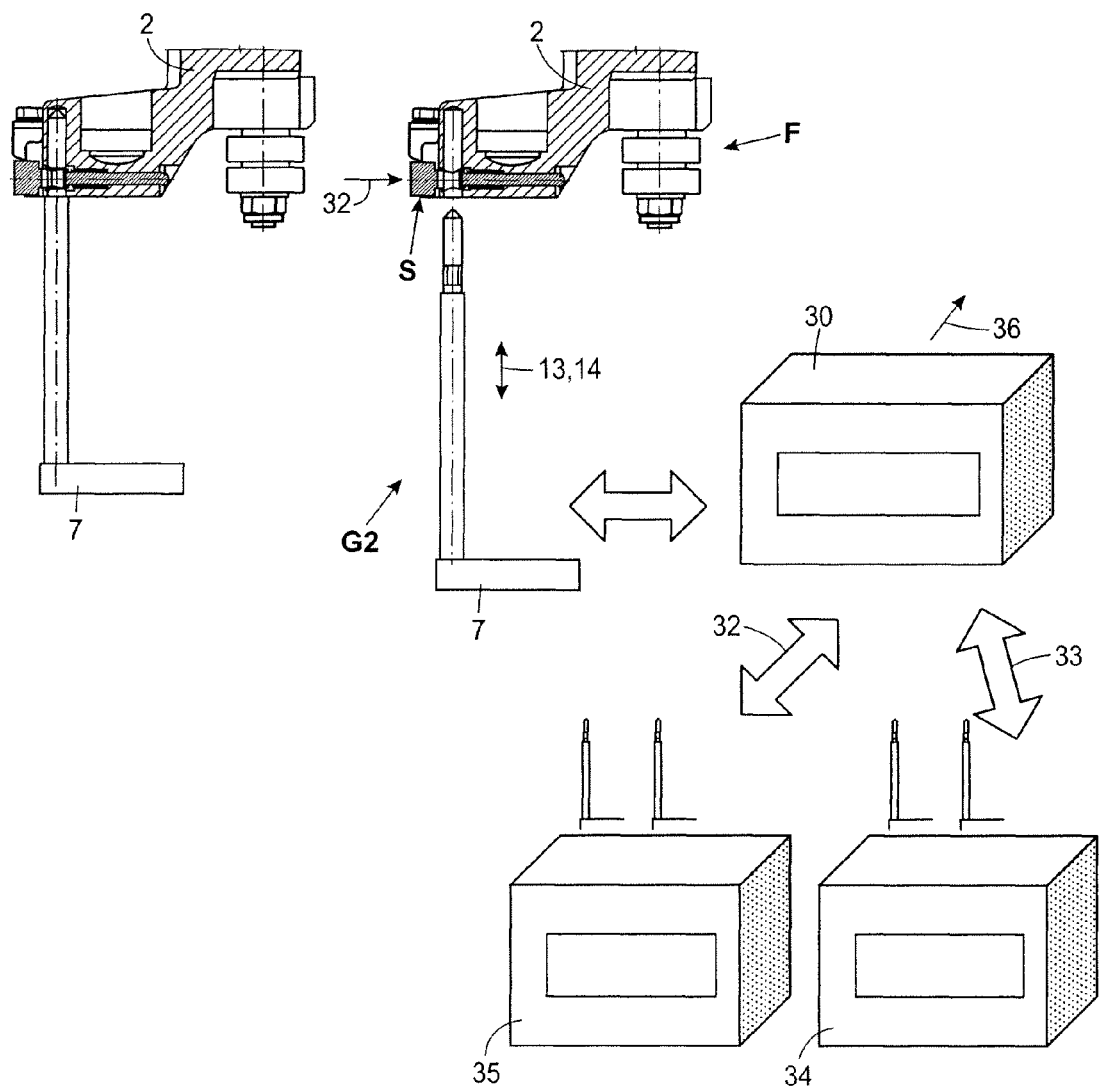
FIG. 5 is a schematic representation of a fully or semiautomatic fitting exchange system.

FIG. 5 schematically illustrates an automatically operable quick-change system for the fittings G2 and shielding plates 7, respectively, in the production line F of the blow molding machine M. A stationarily arranged automatic changer 30 is provided at the production line F, which could be moved to the production line F and, if necessary, docked to the same, for example, for a changing procedure. In another alternative, the automatic changer 30 could be integrated in a star-shaped rotor, which operates in cycles according to the change cycles of the production line and exchanges one fitting G2 after the other or a group of fittings at once. The automatic changer 30, which is movable to the production line, for example, in the direction of arrow 36, comprises at least one driven actuator 32 oriented toward the respective securing element S and applying the force to allow the removal or insertion of the fitting G2 in the direction of the double arrow 13, 14. The removal and insertion, respectively, is accomplished by correspondingly controlled grippers 31, 32, 33. Moreover, the automatic changer 30 is provided with at least one magazine 35, 34, expediently a magazine 34 for removed fittings G2 and a magazine 35 for fittings G2 to be inserted.

Although the automatic changer shown in FIG. 5 is only explained and illustrated in connection with the exchange of the fittings G2 in the form of shielding plates 7, it could in an alternative embodiment simultaneously also perform the exchange of other fittings, e.g. of the preform mandrels 3. The respective automatic changer 30 could act as a semiautomatic machine, which means that one or the other manipulation is carried out by the automatic changer and/or an operator.

I claim:

1. Blow molding machine for containers, especially plastic bottles from preforms, comprising a production line for thermally pre-treating preforms transported by holders, each holder containing a shielding plate comprising an exchangeable fitting and a securing element for exchangeably fixing the shielding plate in the holder, the shielding plate having at least one plug-in foot which is secured in the holder in at least one plug receptacle by means of a quick-change element as the securing element when engaging with the at least one plug-in foot, the quick-change element remaining on the holder during exchange of the shielding plate and is adapted to be adjusted one of manually, by changer machine, or by a combination thereof between a securing position for engaging at the plug-in foot and a release position with respect to the plug-in foot by a force that is external with respect to the holder and the quick-change element and is exerted on a specific point of the quick-change element so that the plug-in foot for exchange of the shielding plate can be drawing linearly out of the plug-in receptacle.

2. Blow molding machine according to claim 1, wherein the quick-change element defines one of a press-button or a draw-button which is linearly movable in the holder in a direction transverse to the plug receptacle and is guided in the direction of adjustment against a force of a spring element.

3. Blow molding machine according to claim 1, wherein the shielding plate comprises two parallel plug-in feet, and wherein the holder comprises two plug receptacles for the plug-in feet, and that the respective quick-change element is assigned to at least one plug receptacle in the holder.

4. Blow molding machine according to claim 1, wherein the quick-change element requires the application of the external force only for the removal of the shielding plate from the holder while the quick-change element is adjustable towards the release position by internal force applied by the plug-in foot when linearly inserting the plug-in foot into the plug receptacle.

5. Blow molding machine according to claim 1, wherein the plug-in foot comprises a circumferential cavity for the engagement of the quick-change element in the secured position of the quick-change element, and wherein the quick-change element comprises an engagement portion insertable into the circumferential cavity in the secured position of the quick-change element.

6. Blow molding machine according to claim 1, wherein a channel crossing the plug receptacle is provided in the holder for accommodating the quick-change element, which is provided with a press-button head on a shaft, the press-button head projecting out of the channel and being externally accessible for the exertion of the external force, and which is pre-stressed in one adjustment movement direction by a spring element designed as a helical spring and supported in the channel and on the shaft, and wherein the quick-change element is secured against falling out of the channel by interacting limit stops on the shaft and on the holder.

7. Blow molding machine according to claim 6, wherein the channel passes through the holder and the shaft projects over a channel opening at the end opposite the press-button head and carries a limit stop for cooperating with the channel opening.

8. Blow molding machine according to claim 6, wherein one of the shaft, the press-button head or combination thereof is passed through by a passage in the transverse direction which passage is oversized with respect to the outer diameter of the plug-in foot at least in the direction of adjustment of the quick-change element.

9. Blow molding machine according to claim 6, wherein the release position of the quick-change element is defined by the interaction between the press-button head and the channel opening facing the press-button head.

10. Blow molding machine according to claim 1, wherein along the production line at least one drivable automatic quick-change machine is provided for exerting the external force on the respective quick-change element and/or inserting and/or linearly drawing out the respective shielding plate.

11. Blow molding machine according to claim 10, wherein the automatic quick-change machine comprises at least one quick-change element actuator and at least one shielding plate gripper.

12. Blow molding machine according to claim 10, wherein the automatic quick-change machine is arranged stationarily relative to the production line and is operable in cycles in coordination with one of advance motion cycles of the production line or to travel along with the production line in a star-shaped rotor.

13. Blow molding machine according to claim 5, wherein the circumferential cavity is a circumferential groove in the plug-in foot.

14. Blow molding machine according to claim 6, wherein the press-button head is pre-stressed in the adjustment direction of the quick-change element towards the secured position.

15. Blow molding machine according to claim 7, wherein the limit stop is detachable.

16. Blow molding machine according to claim 8, wherein the passage comprises an oblong hole.

17. Blow molding machine according to claim 11, wherein the automatic quick-change machine comprises at least one shielding plate magazine.

18. Fitting holder for a blow molding machine, comprising a shielding plate inserted into a plug receptacle of the holder and secured by a securing element of the holder, the shielding plate having at least one plug-in foot linearly inserted into the plug receptacle of the holder, the securing element being a quick-change element which remains on the holder during exchange of the shielding plate and is adjustable on the holder between a securing position engaging at the plug-in foot and a release position with respect to the plug-in foot by a force that is external with respect to the fitting-part holder and the quick change element and is exerted substantially linearly on a certain location of the quick-change element, and the quick-change element in the release position allowing to linearly draw out the plug-in foot from the plug receptacle.

* * * * *